United States Patent [19]
Dover

[11] 3,764,017
[45] Oct. 9, 1973

[54] INFUSION FILTER
[75] Inventor: Jay L. Dover, Ottawa, Ontario, Canada
[73] Assignee: International Travel & Transportation Company Limited, Nassau, Bahamas Islands
[22] Filed: Aug. 12, 1971
[21] Appl. No.: 171,201

[30] Foreign Application Priority Data
Feb. 4, 1971  Canada .................................. 104468

[52] U.S. Cl. ................................. 210/481, 99/287
[51] Int. Cl. ............................................. B01d 35/28
[58] Field of Search ....................... 99/287, 290, 295, 99/298, 323; 210/473, 477, 478-482

[56] References Cited
UNITED STATES PATENTS
3,094,917  6/1963  Rombouts ............................. 99/287
1,767,544  6/1940  Miller .................................... 210/482

*Primary Examiner*—Charles N. Hart
*Attorney*—March and Le Fever

[57] ABSTRACT

An improved infusion filter is provided. The filter includes a main single open-ended frusto-conical chamber, an annular ledge integral with the closed end of the chamber at the end having the smaller diameter, a depending, auxiliary cylindrical chamber integral with the ledge and depending from the main chamber, the auxiliary cylindrical chamber having a perforated main bottom to which is fixed a filter disc, the auxiliary chamber being of smaller diameter than the main chamber, and a perforated retaining disc mounted within the main chamber adjacent the auxiliary chamber. The improvement resides in providing the retaining disc with a central, depressed portion which is adapted, prior to infusion use of the filtering device, to be disposed within the auxiliary cylindrical chamber to retain the infusion material therein, and during infusion use, to be disposed mainly in the main chamber.

10 Claims, 24 Drawing Figures

PATENTED OCT 9 1973 3,764,017

INVENTOR
JAY L. DOVER
BY MARCH + LE FEVER
ATTORNEYS

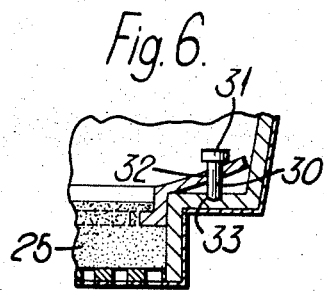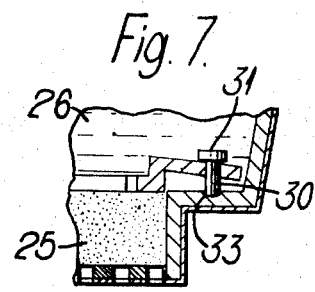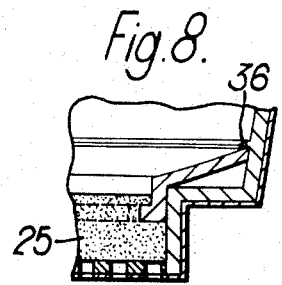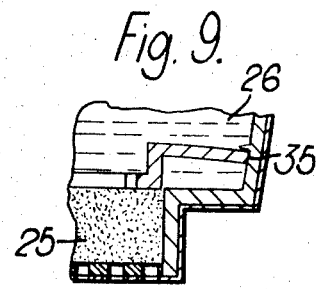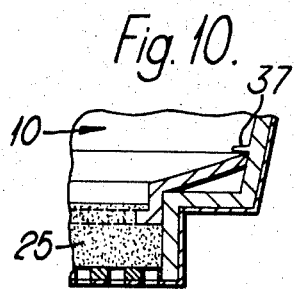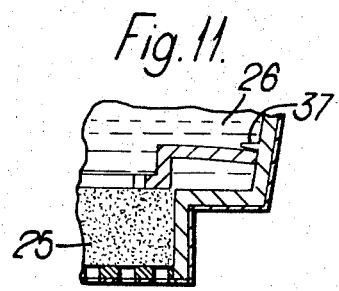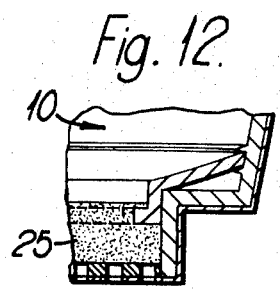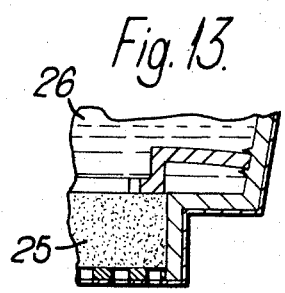

PATENTED OCT 9 1973 3,764,017

INVENTOR
JAY L. DOVER
BY
MARCH & LEFEVER
ATTORNEYS

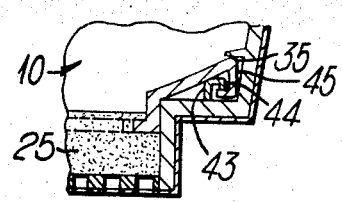
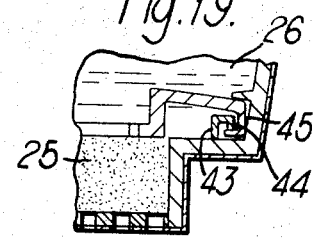
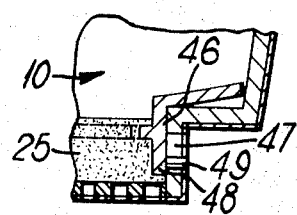
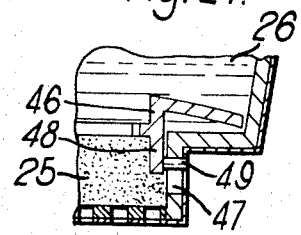
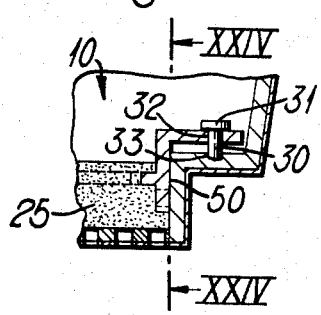
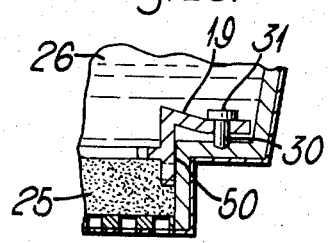
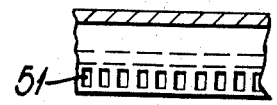

INFUSION FILTER

BACKGROUND OF THE INVENTION

1. Field of the Invention

This invention relates to apparatus for the preparation of an infusion of aromatic substances in separate measured amounts. The apparatus may be made and designed for single, throw-away use, or may be refilled for multiple usage.

2. Problems of the Art

A problem arises mainly in the preparation of beverages, for example, coffe, tea, hot chocolate, soup, broths (e.g. Bovril, Oxo) and more especially coffee, in separate measured amounts, principally to provide efficient organization and economy in lunch rooms. The main difficulty which is to be met in this respect lies in the fact that the apparatus must not only be quite simple and of little weight, but that for the purpose of a single-use, throw-away infusion filter, it must also be made in such a way that it is practically impossible to use it a second time for the same purpose. These conditions must be fulfilled without impairing in any way the normal flow of boiling liquid through the substance of which the infusion is to be made.

DESCRIPTION OF THE PRIOR ART

Infusion filters presently in use for this purpose are in the form of a container provided both with a perforated main bottom as well as a false bottom which is also perforated. In one form of such infusion filter, the container is a bowl of frusto-conical shape, provided with an annular ledge and a cylindrical member integral with the ledge and located outside the bowl. The cylindrical member has a perforated bottom and is used to contain the material out of which the infusion is made. One improvement in such infusion filter involves providing the connection between both bottoms in such a way that the false bottom rests loosely on the mass of substance of which an infusion is to be made, i.e., without exerting any pressure thereon, and in such a way that it can move away from the main bottom along appropriate guides. In this way, the displacement is accurately limited.

By such structure, the mass of which an infusion is to be made is no longer contained in a space with constant volume as is the case with conventional systems, but is contained in a space with variable volume. The variable volume is, however, strictly limited to a certain maximum. Due account is thus taken of the swelling which the infusing substance undergoes in the presence of the liquid medium, and this is in such a way that this swelling can no longer give rise to an internal pressure which tends to limit the flow of the liquid through the substance.

In order to limit the displacement, small guiding elements are provided, made for instance of some thermoplastic substance, which after introduction of the substance and placement of the false bottom thereon, can be easily deformed, with the result that an assembly is obtained which can no longer be disassembled or otherwise tampered with.

A still further improvement over the above-described improved infusion filter was provided by making the main bottom and the false bottom each of a filter disc, and by securing the filter disc to the annular ledge. It was thought that the filter disc would be of sufficient resiliency to provide some change in volume in the cylindrical member.

Problems currently exist, however, since the volume of the cylindrical member is usually greater than the quantity of infusion material charged to such member. Consequently, spillage during transportation and storage is a problem.

OBJECTIVES OF THE INVENTION

An object of a main aspect of this invention is to provide an infusion filter in which the problem of spillage is substantially overcome while, also, the problem of variable volume to minimize internal back pressure is substantially overcome.

SUMMARY OF THE INVENTION

Broad Statement of the Invention

By a broad aspect of this invention, an improved infusion filter is provided comprising a main frusto-conical open-ended chamber, an annular ledge integral with the closed end thereof, and a cylindrical auxiliary chamber integral with the ledge and depending from the main chamber, the cylindrical auxiliary chamber having a perforated bottom provided with a filter disc fixed thereto and being of smaller diameter than the main chamber, and a perforated retaining disc mounted within the main chamber adjacent to the auxiliary chamber, the improvement comprising a central depressed portion of the retaining disc adapted, prior to infusion use of the filtering device, to be disposed within the auxiliary cylindrical chamber to retain the infusion material therein, and during infusion use, to be disposed in the main chamber.

General Description of Embodiments of the Invention

There are many configurations of the retaining disc and many ways of securing the retaining disc to the container. The retaining disc is provided with a central, depressed perforated or porous portion which is of slightly less diameter than the infusion material containing depending auxiliary cylindrical chamber. The depressed portion rests on the infusion material.

When boiling water is poured into the container, the central portion is urged out of the cylindrical chamber and the change in volume is automatically effected. The retaining disc preferably is of a concave cross-section initially, but, during use, it adopts a convex cross-section. However, the depressed area only may be movable from within the cylindrical chamber to outside the cylindrical chamber by any other means.

There are many ways of securing the retaining disc to the frusto-conical main chamber. In one, a plurality of push pins or removable screws may be used to secure the disc to the annular ledge.

In another, the side wall of the frusto-conical main chamber may be provided with a retaining circumferential inset valley or projecting ridge, or a plurality of projecting pins, each being slightly spaced above the annular ledge, to retain the disc between the valley, ridge or projecting pins and the ledge.

The disc may be removably secured as well. One way would be the provision of a plurality of upstanding partial cylindrical walls on the ledge with cooperating circumferential slits in the disc. Securement would be effected by mating and then partially rotating.

Another way would involve the provision of a circumferential wall with overhanging lip on the ledge, and cooperating downward flange on the disc, to provide a snap-on fit.

Still another way involves the provision of radially inwardly projecting pins on the circumferential walls of the depending cylindrical chamber. These cooperate with vertical circumferential slits in the circumferential wall of the central depressed section of the disc.

The infusion filter is preferably injection molded out of a suitable synthetic plastic, e.g., thermoplastic, material. Examples include polystyrene and polyvinyl chloride, although any equivalent material may be used.

The main bottom is perforated, preferably radially slitted. For optimum filtering results, the main bottom is fitted with a filter disc, of, e.g., cellulosic material.

The retaining disc is also formed of a thin sheet of injection molded synthetic thermoplastic material. It may also be polystyrene or polyvinyl chloride. It is provided with a plurality of apertures, usually in the form of a plurality of interrupted arcuate slits of different radii.

DESCRIPTION OF THE PREFERRED EMBODIMENTS

Brief Description of the Drawings

The accompanying drawings are schematic views of embodiments of this invention.

FIGS. 6 and 7 are half-vertical sections of a portion of another embodiment of this invention, in unused and used condition respectively;

FIGS. 8 and 9 are half-vertical sections of a portion of another embodiment of this invention, in unused and used condition, respectively;

FIGS. 10 and 11 are half-vertical sections of a portion of another embodiment of this invention, in unused and used condition, respectively;

FIGS. 12 and 13 are half-vertical sections of a portion of another embodiment of this invention, in unused and used condition, respectively;

FIGS. 18 and 19 are half-vertical sections of a portion of another embodiment of this invention, in unused and used condition, respectivley, FIGS. 20 and 21 are half-vertical sections of a portion of another embodiment of this invention, in unused and used condition, respectively;

FIGS. 22 and 23 are half-vertical sections of a portion of another embodiment of this invention, in unused and used condition, respectively; and FIG. 24 is a partial side elevational view along the line XXIV—XXIV of the embodiment of FIGS. 22 and 23.

DETAILED DECRIPTION OF THE DRAWINGS

DESCRIPTION OF FIGS. 1 - 3

Figure 1:
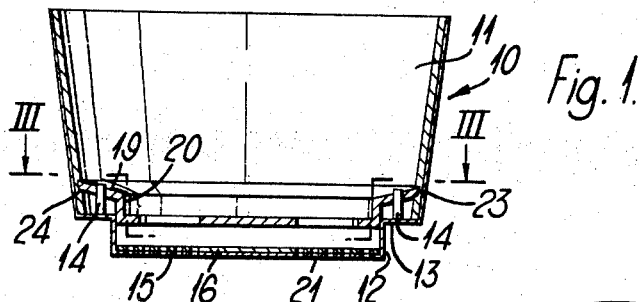
FIG. 1 is a central section of one embodiment of the infusion filter of this invention.
Figure 2:
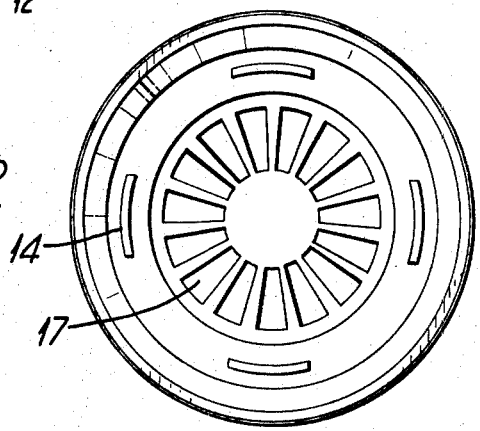
FIG. 2 is a bottom plan view of the embodiment of FIG. 1.
Figure 3:
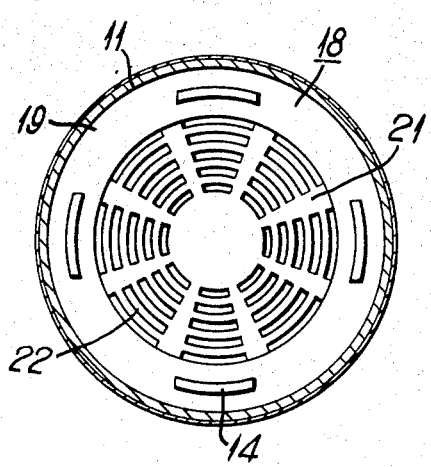
FIG. 3 is a horizontal section along the line III—III of FIG. 1.

Turning to FIGS. 1 - 3, the infusion filter 10 comprises an open-ended main frusto-conical chamber 11, its closed end providing an annular ledge 13 integrally connected to a depending auxiliary cylindrical chamber 12. Depending from the lower face of the annular ledge 13 is a plurality of arcuate guides 14, which are used to support the filter on a cup. The bottom 15 of the cylindrical chamber 12 is perforated, e.g., by means of fan-shaped segments 17. The bottom 15 is covered with a filter disc 16 of a suitable cellulosic material.

The retaining disc 18 is injection molded out of a thin thermoplastic material. It includes three main areas: a normally concave, outer annular ring 19; a downwardly depending circumferential wall 20; and a perforated bottom 21. The perforated bottom 21 is provided with a plurality of interrupted, arcuate slits 22 of varying radii. The outer rim 23 of the disc is disposed in a horizontal circumferential valley 24 and is retained in such valley 24. As indicated before, the valley 24 may be a projecting ridge, or a plurality of projecting pins.

DESCRIPTION OF FIGS. 4 AND 5

Figure 4:
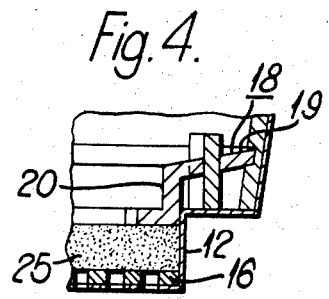
FIG. 4 is a half-vertical section of a portion of the embodiment of FIG. 1 showing the loaded infusion filter prior to use.

FIG. 4 shows the infusion filter 10 prior to use. The disc 18 is fully concave, with the central area 21 pressed down on the measured dose of ground coffee 25 in the depending auxiliary cylindrical chamber 12. It is seen that this configuration minimizes, if not completely avoids, spillage of ground coffee 25 during shipping and storage.

Figure 5:
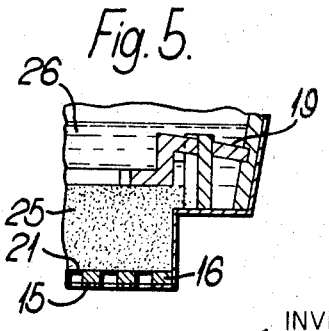
FIG. 5 is a half-vertical section of a portion of the embodiment of FIG. 1 showing the infusion filter during use.

FIG. 5 shows the infusion filter 10 during use and containing boiling water 26. The disc 18 is fully convex, with the central area 21 spaced from the ground coffee 25. This provides an effective expansion of the depending, auxiliary cylindrical chamber 12 to minimize back pressure.

Other embodiments of the invention will now be described.

DESCRIPTION OF FIGS. 6 AND 7

In FIGS. 6 and 7, the disc 18 is retained in relatively fixed position but still being permitted to flex from a concave to convex cross-section by means of push pins or screws 30 provided with a retaining head 31, passing through registering holes 32, 33 in the disc 18 and ledge 13, respectively.

DESCRIPTION OF FIGS. 8, 9, 10 AND 11

In FIGS. 8 and 9, the disc 18 is retained in relatively fixed position but still being permitted to flex from a concave to a convex cross-section by means of engagement of the outer rim 35 of the disc 18 below a radially inwardly projecting horizontal ridge 36. FIGS. 10 and 11 are similar, except the engagement is below a plurality of circumferentially spaced-apart, radially inwardly projecting pins 37.

DESCRIPTION OF FIGS. 12, 13 AND 14

Figure 14:
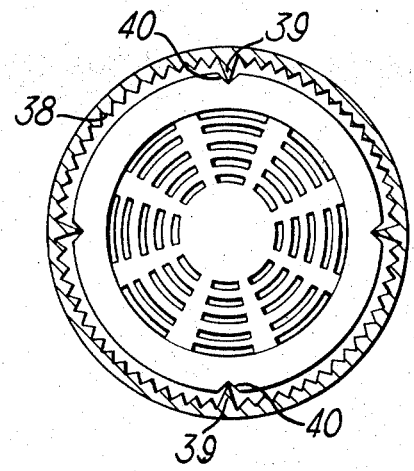
FIG. 14 is a top plan half-horizontal view of the embodiment of FIGS. 12 and 13.

In the embodiment of FIGS. 12, 13 and 14, the same effect is achieved within a main chamber 11 whose walls are internally crinkled by horizontal ridges 38. Four spaced-apart partial posts 39 of V-shaped cross-section are provided, much like pins 37. The disc 18 is provided with mating, V-shaped notches 40, and, after the disc 18 and posts 39 are mated, the disc is rotated slightly to lock it in place. In this embodiment, also, additional water through-flow is provided between the outer rim 35 of the disc and the ridges 38.

DESCRIPTION OF FIGS. 15, 16 AND 17

Figure 15:
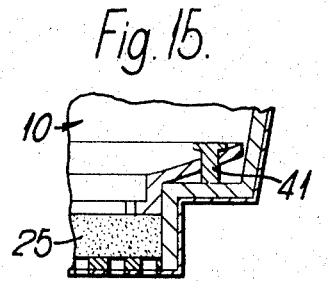
FIGS. 15 and 16 are half-vertical sections of a portion of another embodiment of this invention, in unused and used condition, respectively.
Figure 16:
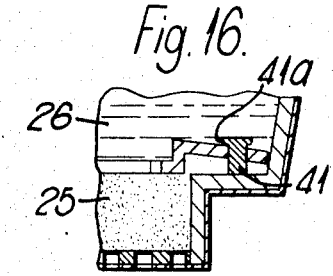
Figure 17:
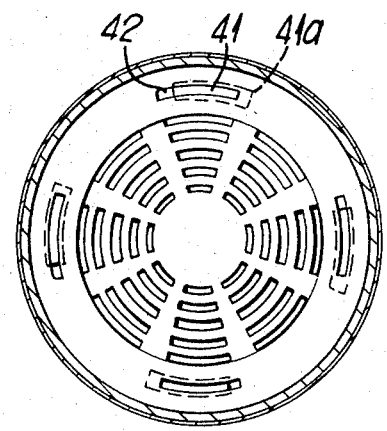
FIG. 17 is a top plan half-horizontal view of the embodiment of FIGS. 15 and 16.

In the embodiment of FIGS. 15, 16 and 17, the same effect is achieved by providing four partial, circumferential wall-like posts 41 projecting from the ledge 13. Posts 41 are provided with flanges 41a. The disc 18 is provided with four mating arcuate slits 42. After the disc 18 is fitted by mating slits 42 and posts 41, the disc 18 is slightly rotated to lock it in place.

DECRIPTION OF FIGS. 18 AND 19

In the embodiment of FIGS. 18 and 19, the same effect is achieved by means of circumferential wall 43 provided with a down-turned upper edge 44. Disc 18 is provided with a mating downward flange 45 at the rim 35 to provide a snap-on fit.

DESCRIPTION OF FIGS. 20 AND 21

In the embodiment of FIGS. 20 and 21, the disc 18 is provided with an additional circumferential wall 46 depending downwardly from 19. Wall 46 is provided with a plurality, e.g., four spaced-apart horizontally disposed slits 47. Wall 48 of auxiliary cylindrical chamber 12 is provided with radially inwardly directed pins 49. As the disc 18 flexes from the concave position in FIG. 20 to the convex position in FIG. 21, wall 46 moves upwardly, guided and retained by cooperation between pins 49 and slits 47.

DESCRIPTION OF FIGS. 22, 23 AND 24

In the embodiment of FIGS. 22 – 24, the retaining ring is provided with an open-ended, ring-like wall 50 depending from the perforated depressed bottom 21. The outer annular ring is only very slightly normally concave, and is retained on the ledge 13 by means as described in FIGS. 6 and 7, namely, by means of push pins or screws 30 provided with a retaining head 31, passing through registering holes 32, 33 in the disc outer ring 19 and ledge 13, respectively.

Wall 50 is provided with a plurality of vertically arranged slots 51. When hot water is poured into the frusto-conical chamber 11, the retaining disc adopts the position shown in FIG. 23. The slots 51 are thus exposed above the level of ledge 13 and hot water is permitted to pass into the coffee in the cylindrical chamber 12.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be within the full range of equivalence of the following claims.

I claim:

1. In an infusion filter including a main single open-ended frusto-conical chamber, an annular ledge integral with the closed end of said chamber at the end having the smaller diameter, a depending, auxiliary cylindrical chamber integral with said ledge and depending from said main chamber, said auxiliary cylindrical chamber having a perforated main bottom to which is fixed a filter disc, the auxiliary chamber being of smaller diameter than said main chamber, and a perforated retaining disc mounted within said main chamber adjacent said auxiliary chamber, the improvement comprising: providing said retaining disc with a central depressed portion of slightly less diameter than the diameter of said depending auxiliary cylindrical chamber and adapted, prior to infusion use of said filtering device, to be disposed in force-fit contact within said auxiliary cylindrical chamber, the bottom of said central depressed portion being in contact with said infusion material to retain said infusion material in said auxiliary cylindrical chamber and said central depressed portion during infusion use being forced upwardly and raised out of said depending auxiliary cylindrical chamber to be disposed mainly in said main chamber.

2. The infusion filter of claim 1 wherein the central depressed portion of the retaining disc is provided with a porous bottom.

3. The infusion filter of claim 2 wherein the retaining disc is initially of concave cross-section, and during use, flexes to a convex cross-section.

4. The infusion filter of claim 2 wherein the retaining disc is secured to the annular ledge by removable push pins or screws.

5. The infusion filter of claim 2 wherein the retaining disc is secured to the filter by a horizontal circumferential inset valley or projecting ridge or a plurality of projecting pins in the interior circumferential side walls, spaced above the annular ledge.

6. The infusion filter of claim 2 wherein the retaining disc is secured to the filter by a plurality of partial cylindrical walls upstanding from the ledge and cooperating circumferential slits in the retaining disc.

7. The infusion filter of claim 2 wherein the retaining disc is secured to the filter by a circumferential wall with overhanging lips upstanding from the annular ledge and cooperating downwardly depending flanges on the retaining disc, to provide a snap-on fit.

8. The infusion filter of claim 2 wherein the retaining disc is secured to the filter by a plurality of radially inwardly projecting pins on the circumferential walls of the depending cylindrical chamber, cooperating with vertical circumferential slits in the circumferential wall of the central depressed area of the retaining disc.

9. The infusion filter of claim 2 wherein the retaining disc is provided with an open-ended cylindrical wall depending from the central depressed portion, the wall being provided with a plurality of access vertical slits.

10. The infusion filter of claim 2 wherein the retaining disc is provided with an open-ended cylindrical wall depending from the central depressed portion, the wall being provided with a plurality of access vertical slits and wherein the disc is secured to the annular ledge by removable push pins or screws.

* * * * *